United States Patent [19]
Chitsaz et al.

[11] Patent Number: 5,905,923
[45] Date of Patent: May 18, 1999

[54] VIDEO CAMERA MOUNTING ASSEMBLY WITH FRICTION BEARINGS FOR INHIBITING PAN AND TILT MOVEMENTS

[75] Inventors: Bijan Chitsaz, Boca Raton; Melvin Todd, Deerfield, both of Fla.

[73] Assignee: Sensormatic Electronics Corporation, Boca Raton, Fla.

[21] Appl. No.: 09/017,261

[22] Filed: Feb. 2, 1998

[51] Int. Cl.[6] .................................................. G03B 17/24
[52] U.S. Cl. .................... 396/428; 348/373; 248/183.3
[58] Field of Search .................. 267/134, 135; 384/218, 225; 464/40; 248/183.3; 59/79.2; 63/5.2; 72/434; 192/12 BA, 203, 121; 396/419, 427, 428; 348/143, 150, 151, 373

[56] References Cited

U.S. PATENT DOCUMENTS

| | | | |
|---|---|---|---|
| 3,266,855 | 8/1966 | Cleff | 384/203 |
| 3,720,147 | 3/1973 | Bemis | 95/86 |
| 3,732,368 | 5/1973 | Mahlab | 178/7.81 |
| 3,819,856 | 6/1974 | Pearl | 178/7.81 |
| 3,916,097 | 10/1975 | Imai | 178/7.2 |
| 4,225,881 | 9/1980 | Tovi | 358/108 |
| 4,649,532 | 3/1987 | Aldehoven | 369/270 |
| 4,736,218 | 4/1988 | Kutman | 354/81 |
| 4,796,039 | 1/1989 | Pagano | 354/81 |
| 4,901,146 | 2/1990 | Struhs et al. | 358/108 |
| 4,945,367 | 7/1990 | Blackshear | 354/81 |
| 5,121,215 | 6/1992 | Boers et al. | 358/229 |
| 5,153,623 | 10/1992 | Bouvier | 354/81 |
| 5,181,120 | 1/1993 | Hickey et al. | 358/229 |
| 5,394,184 | 2/1995 | Anderson et al. | 348/151 |
| 5,394,209 | 2/1995 | Stiepel et al. | 354/81 |
| 5,809,136 | 9/1998 | Turner | 379/438 |

*Primary Examiner*—David M. Gray
*Attorney, Agent, or Firm*—Robin, Blecker & Daley

[57] ABSTRACT

A fixed-position, but manually adjustable, video camera mounting assembly employs frictional bearing elements in place of ball bearings that are present in a corresponding motor-driven remotely controllable movable mounting assembly. The frictional bearing elements are endless toroidal coil springs which provide durability and satisfactory performance over a wide range of temperatures. The endless coil springs are fashioned from linear springs which have an open end and an opposed reduced-diameter end which is pluggable into the open end.

31 Claims, 4 Drawing Sheets

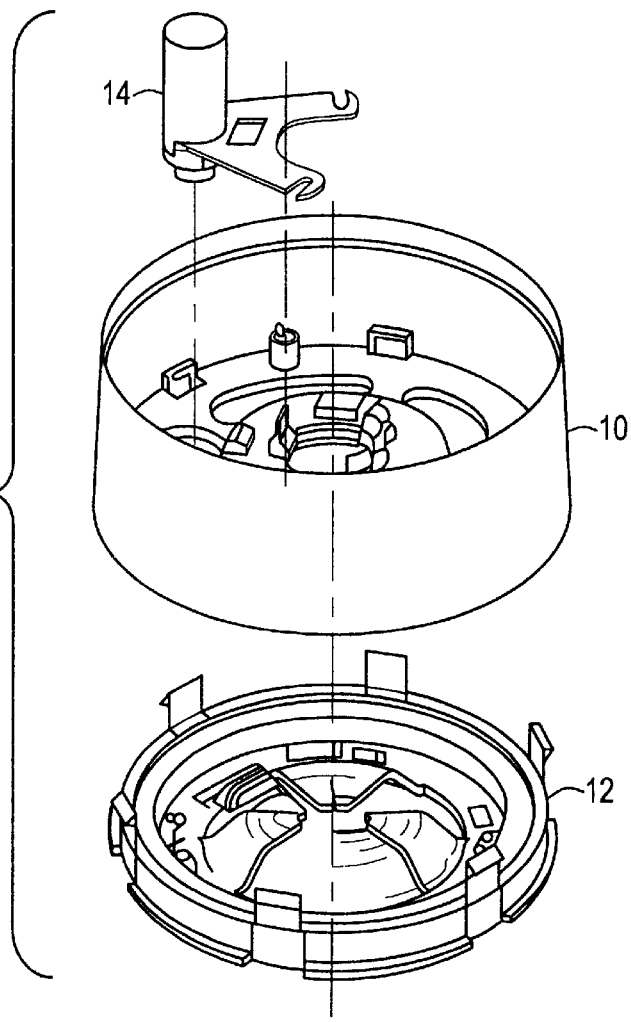
FIG. 1
FIG. 5
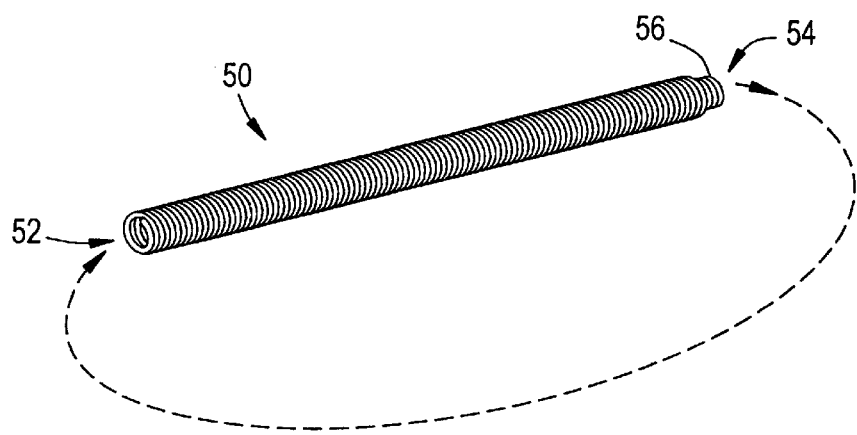

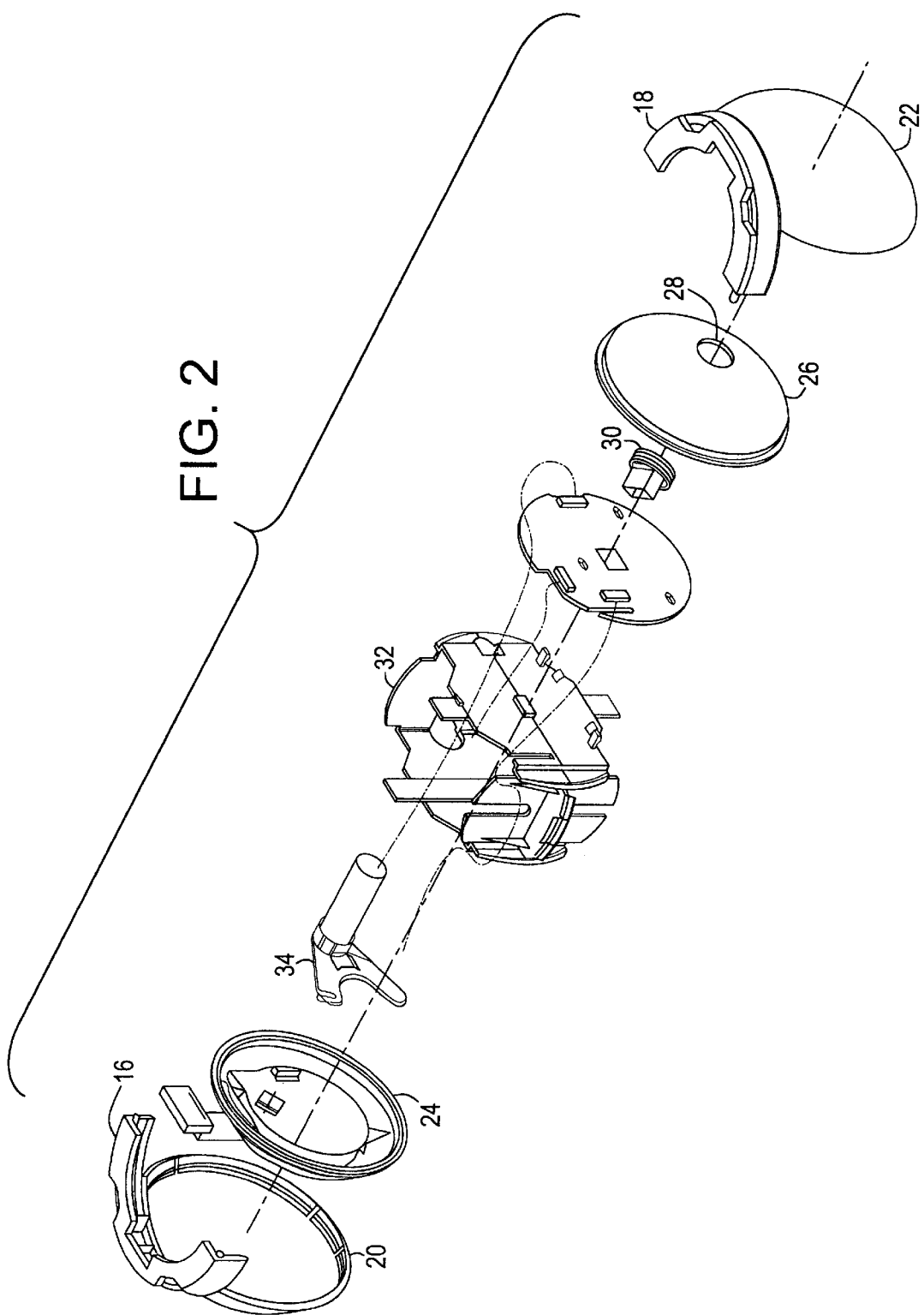

VIDEO CAMERA MOUNTING ASSEMBLY WITH FRICTION BEARINGS FOR INHIBITING PAN AND TILT MOVEMENTS

FIELD OF THE INVENTION

This invention relates to video surveillance equipment, and, more particularly, to an assembly in which a video camera is to be mounted.

BACKGROUND OF THE INVENTION

It is known to provide a housing and other support components for a video camera and lens assembly so as to permit the camera and lens assembly to be rotatable about first and second (vertical and horizontal) axes. In this sort of camera supporting structure, the camera and lens assembly can be caused to undergo a panning motion (i.e., rotation about the vertical axis) and a tilting motion (i.e., rotation about the horizontal axis) so as to completely scan a location of interest. Motors are provided for carrying out the panning and tilting motion, and the motors are subject to remote control through known signalling equipment.

A particularly advantageous type of video camera support structure is described in application Ser. No. 08/892,042, filed Jul. 14, 1997. The '042 patent application has a common assignee with the present application, and the disclosure thereof is incorporated herein by reference.

A number of the key components of the camera mounting structure of the '042 patent application are shown in FIGS. 1 and 2 of the present application and will now be briefly described.

In FIG. 1, reference numeral 10 indicates a main housing for the video camera support structure of the '042 patent application. Installed within the main housing 10 is a panning assembly 12 which includes an outer race member and an inner race member, which are not shown separately in FIG. 1. The outer race member is fixedly mounted to the main housing 10 and the inner race member is free to rotate relative to the outer race member about a vertical axis. The two race members of the panning assembly define therebetween a toriodal race plenum (not shown) in which ball bearings are disposed so as to provide for minimal resistance to the rotation of the inner race member relative to the outer race member. A panning motor 14 is also disposed within the housing 10. The panning motor 14 engages a gear (not separately shown in FIG. 1) on the inner race component of the panning assembly 12 and selectively rotates the inner race component about a vertical axis to cause a panning motion.

FIG. 2 shows, in an exploded view, additional portions of the camera support structure, including a yoke bracket formed of bracket-halves 16 and 18. The bracket formed of bracket halves 16 and 18 is mounted to the inner race component of the panning assembly 12 for rotation with the inner race component.

Part-spherical housing sections 20 and 22 are respectively mounted to the bracket halves 16, 18. The housing sections 20, 22 respectively have part-spherical bearings 24, 26 mounted therein. Each of the bearings 24, 26 has a portion which defines the outer boundary of a toroidal ball-bearing race plenum; only the race-defining portion 28 of bearing 26 is shown in FIG. 2. A respective inner race-defining part is mated with the race-defining portions of the bearings 24, 26, so that a complete toroidal bearing race plenum is defined at each of the bearings. (Only the inner race-defining part 30 which corresponds to the bearing 26 is shown in FIG. 2.)

Ball bearings, which are not shown in the drawing, are disposed in the toroidal races defined by the bearings 24, 26 and inner race-defining parts (including part 30), so that the inner race-defining parts are easily rotatable about a horizontal axis.

A camera mounting yoke 32 is in the form of a cage, and is mounted on the inner race-defining parts for rotation therewith about the horizontal axis.. The camera mounting yoke 32 defines an enclosure in which a video camera (not shown) is mounted, so that the camera is rotated about the horizontal axis for tilting motion. It will also be recognized that the yoke 32 rotates about the vertical axis with the yoke bracket for panning motion.

Also shown in FIG. 2 are a motor 34 which drives the yoke 32 for tilting operations and a circuit board 36 which is mounted for movement with the camera yoke 32.

The camera mounting structure disclosed in the above-referenced '042 patent application, and illustrated in part in FIGS. 1 and 2, has advantages in comparison to previous camera dome assemblies, including compact size and ease in assembling and disassembling. This device is being manufactured and distributed by the assignee of the application, Sensormatic Electronics Corporation, under the trademark "Speed Dome Ultra". However, for many surveillance applications a camera that is moveable by remote control is not required, even though it may be desirable that a support structure for mounting a camera in a fixed position be arranged so that the camera's position can be changed easily by hand to adjust the direction of view of the camera.

OBJECTS AND SUMMARY OF THE INVENTION

It is accordingly an object of the invention to provide a mounting structure for a video surveillance camera in which the camera is supported in a fixed position that can be easily and manually adjusted.

It is a further object of the invention to adapt the above-described motor-driven pan and tilt camera mounting assembly to a fixed-position application.

It is still a further object of the invention to provide a camera mounting assembly that can be manufactured economically.

It is still another object of the invention to provide a camera mounting structure that can be assembled easily using parts of a motor-driven, remotely controllable camera mounting structure.

According to the first aspect of the invention, there is provided a video camera mounting assembly including a camera mounting structure, a first structure for defining a first toroidal race plenum, the first plenum having a first axis, and the first structure including a first race member for defining a first side of the first plenum and a second race member for defining a second side of the first plenum, a first resilient element, such as a coil spring, installed in the first plenum for providing substantial resistance to relative movement between the first race member and the second race member and for permitting the first race member to be manually rotated relative to the second race member, and a third structure for securing the camera mounting structure to the first structure. It should be understood that "providing substantial resistance", as used herein and in the appended claims, means providing substantially more frictional resistance to the movement between the first and second race members than would be provided by conventional ball bearings that might otherwise be held in the plenum.

Preferably the first race member defines an inner side of the first plenum and the second race member defines an outer side of the first plenum, and the camera mounting structure is secured by the third structure to the first race member.

It is also preferred that the first axis be a horizontal axis such that rotational movement of the first race member with the camera mounting structure secured thereto results in a tilting movement of the camera.

A preferred embodiment of the invention further includes a fourth structure for defining a second toroidal race plenum, the second plenum having a second axis that is angled relative to the first axis (and is preferably a vertical axis), the fourth structure including a third race member for defining a first side of the second plenum and a fourth race member for defining a second side of the second plenum. The preferred embodiment further includes another resilient element, such as another coil spring, held in the second plenum and similarly providing resistance to relative movement between the third and fourth race members and permitting the third race member to be manually rotated relative to the fourth race member. It is further preferred that the first structure, which defines the first plenum, be secured to the third race means of the fourth structure and that rotational movement of the third race member relative to the fourth race member result in panning movement of a camera mounted to the camera mounting structure.

Further elements of the preferred embodiment include a seventh structure for defining a third toroidal race plenum that has a common axis with the first plenum, the seventh structure including fifth race means for defining an inner side of the third plenum and a sixth race member for defining an inner side of the third plenum. A third coil spring is installed in the third plenum to provide substantial resistance to relative movement between the fifth and sixth race members while permitting manual rotation of the fifth race member relative to the sixth race member, and the camera mounting structure is secured to the fifth race member, so that the first and fifth race members are rotated together for tilting movements of the camera mounting structure.

In this preferred embodiment, the common horizontal axis of the first and third plenums intersects with the vertical axis of the second plenum, with the first plenum being disposed to one side of the vertical axis and the third plenum disposed to an opposite side of the vertical axis.

According to a second aspect of the invention, there is provided a video camera mounting assembly, including a camera mounting structure, a first structure for defining a first toroidal race plenum, the first plenum having a horizontal axis, a second structure for defining a second toroidal race plenum, the second plenum having a vertical axis, a first coil spring installed in the first plenum, a second coil spring installed in the second plenum, a third structure for securing the camera mounting structure to one of the first structure and the second structure, and a fourth structure for securing the first structure to the second structure.

According to a third aspect of the invention, there is provided a method of assembling a video camera mounting assembly, including the steps of wrapping a resilient member around an inner race-defining part, and installing the inner race-defining part, having the resilient member wrapped therearound, in an outer race-defining part.

According to a fourth aspect of the invention, there is provided a coil spring having a first end and a second end, the first end being open and having an outer diameter, the second end having an outer diameter that is less than the outer diameter of the first end, the second end being sized so as to be insertable into the first end in a manner such that the second end mates with the first end.

According to a fifth aspect of the invention, there is provided a method of forming an endless toroidal coil spring from a linear coil spring having an open first end and a second end which has a smaller outer diameter than the first end, the method including the steps of bending the linear coil spring to insert the second end in the open first end, and twisting at least one of the first end and the inserted second end relative to the other to secure the second end inside the first end.

According to a sixth aspect of the invention, there is provided a manually adjustable structure for mounting an object, including a plenum-defining structure for defining a toroidal race plenum, the defining structure including an inner race member for defining an inside of the plenum and an outer race member for defining an outside of the plenum, a toroidal coil spring held in the plenum and a mounting structure for mounting the object to one of the inner race member and the outer race member. Preferably, the coil spring is held in a compressed condition between the inner race member and the outer race member.

In a preferred embodiment of the invention, the three pairs of race-defining elements of the motor-driven camera support assembly are each assembled around a respective coil spring in place of the ball bearings that are positioned between the race-defining element pairs in the motor-driven camera mounting assembly described above. Consequently, the motor-driven assembly is readily adapted to form a fixed position assembly in which the desired position is held by frictional forces imparted by the coil springs to the race-defining element pairs, but the frictional forces provided by the coil springs can be overcome by manipulating the camera mounting assembly to point the camera in a new desired position. Once the new position is set by manually moving the camera support structure the coil springs retain the camera support structure in the desired position.

BRIEF DESCRIPTION OF THE DRAWINGS

The above and other features and aspects of the present invention will become more apparent upon reading the following detailed description in conjunction with the accompanying drawings, in which:

FIGS. 1 and 2 are exploded views of major components of a camera mounting assembly described in patent application Ser. No. 08/892,042.

FIG. 5 shows a linear coil spring provided in accordance with the invention and suitable for fashioning into an endless toroidal coil spring, such as those shown in FIGS. 3 and 4.

DETAILED DESCRIPTION

According to a preferred embodiment of the invention, the motor-driven camera mounting assembly discussed in connection with FIGS. 1 and 2 is adapted for use as a manually adjustable, fixed position camera mounting assembly by: (a) eliminating the motors 14 and 34 and associated circuitry; and (b) replacing the ball bearings held in the three plenums mentioned in connection with FIGS. 1 and 2 with three coil springs sized for installation in the three plenums, respectively. In other words, the low-friction bearings provided in the motor-driven assembly are modified so as to be frictional bearings that can be adjusted by hand, but once moved tend to remain in a fixed position.

Figure 3:
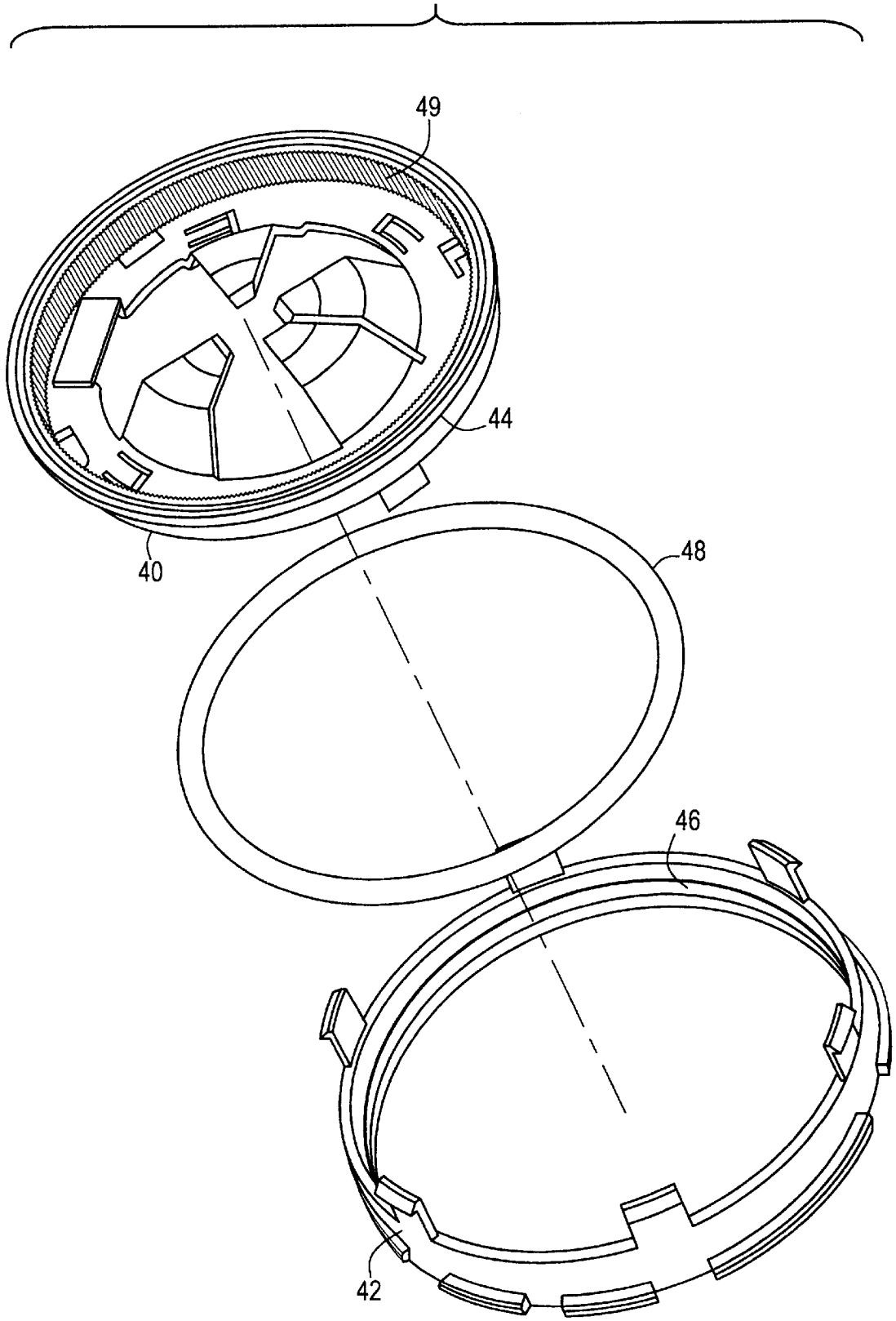
FIG. 3 is a partly schematic, exploded view of a panning assembly shown in FIG. 1, as modified in accordance with the invention.

FIG. 3 shows the pan bearing assembly 12 of FIG. 1 in an exploded condition so that an inner race-defining part 40 and an outer race-defining part 42 are shown as separate pieces. It will be understood that the part 40 has a peripheral surface 44 which defines the inner portion of the above-mentioned toroidal plenum having a vertical axis. Meanwhile, part 42 has an inner surface 46 which, when juxtaposed with the peripheral surface 44 of the part 40, defines the outer portion of the vertical-axis toroidal plenum. Shown schematically at 48 in FIG. 3 is a toroidal coil spring to be held in the plenum defined by parts 40 and 42 so as to inhibit relative motion between parts 40 and 42. (The gear referred to in the "Background" section above is indicated at 49 in FIG. 3.)

Figure 4:
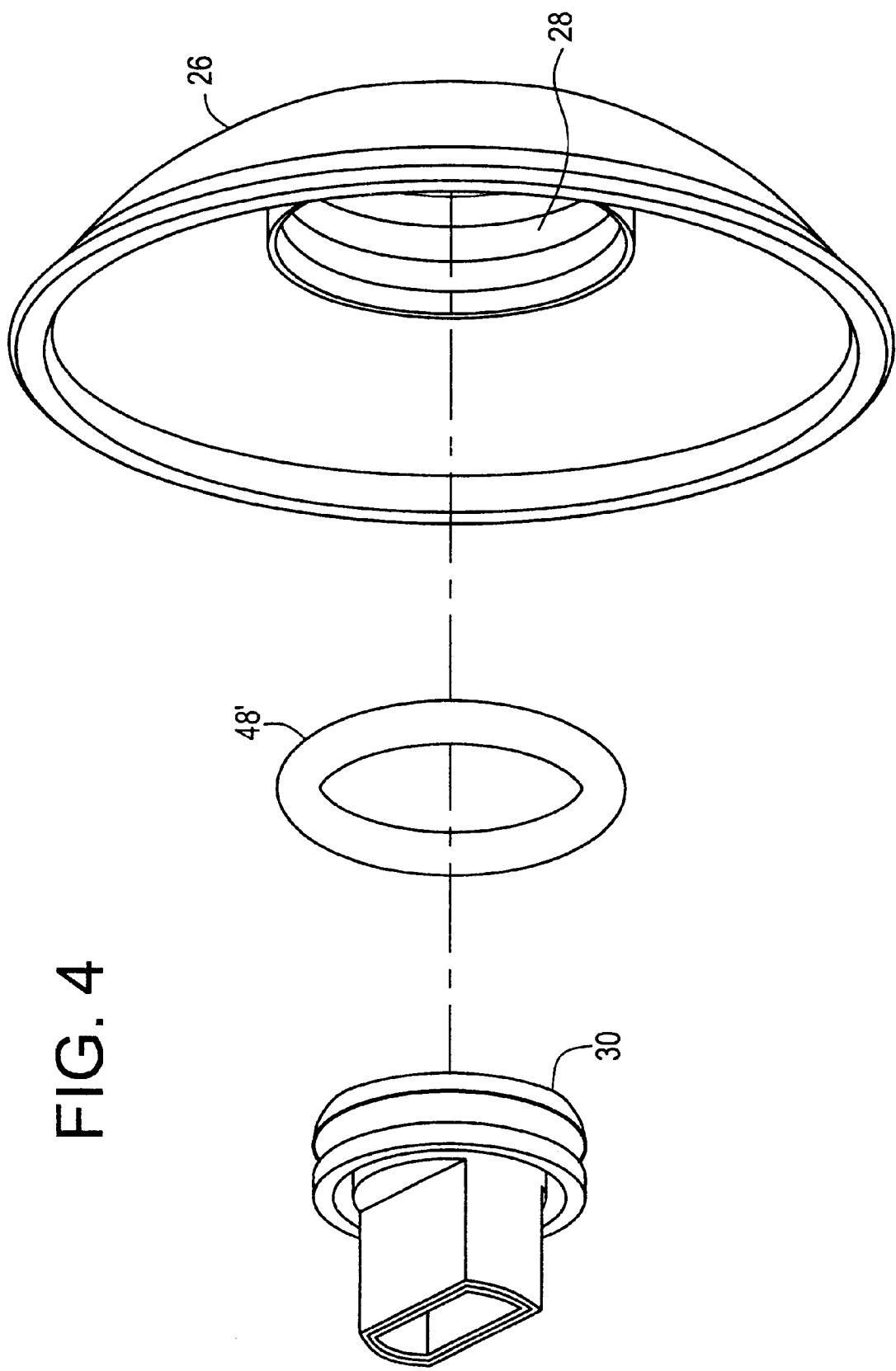
FIG. 4 is a partly schematic, exploded view of tilt-enabling structure shown in FIG. 2, as modified in accordance with the invention.

FIG. 4 similarly shows another toroidal coil spring 48', to be held between the bearing 26 and its corresponding inner race-defining part 30. It is to be understood that an arrangement such as that shown in FIG. 4 is also made with respect to the other part-spherical tilt bearing 24 (FIG. 2), including another coil spring (not shown) held between the bearing 24 and its corresponding inner race-defining part (not shown).

A preferred technique for fashioning the toroidal coil springs will now be described, with reference to FIG. 5. Shown in FIG. 5 is a linear coil spring 50 provided in accordance with the invention. The linear spring 50 includes a first end 52 which is open, and a second end 54 which has a reduced diameter relative to the balance of the spring 50 (including first end 52) so as to form a plug 56 suitable for being inserted into the open end 52. The plug 56 has an outer diameter which substantially corresponds to an inner diameter of the open end 52. To fashion a toroidal coil spring 48 or 48', the linear coil spring 50 is bent so that the plug 56 is inserted into the open end 52. It will be observed that the helical structure of the spring 50 is such as to produce an effective thread structure at the outside of the plug 56 and at the inside of the open end 52. Consequently, after inserting the plug 56 into the open end 52, the ends 54, 52 may be twisted relative to each other to effectively thread the plug 56 into the open end 52, thereby securing the coil spring into a substantially toroidal form.

In a preferred embodiment of the invention, the coil springs are formed from 1/32 inch stainless steel wire. However, it is contemplated to use other materials, including other types and/or gauges of metal, or plastic. Except for the reduced-diameter end 54, the coil spring 50 to be used in fashioning the endless toroidal springs 48, 48' is preferably of construction similar to known coil springs.

In a preferred embodiment of the invention, the races defined by the bearings 24, 26 are different in dimension from the race defined by the pan bearing assembly formed of members 40 and 44. Consequently, it will be recognized that the springs 48' to be used with the bearings 24, 26 are dimensioned differently from the spring 48 used with the pan race-defining members 40, 44. It follows that the linear spring to be used in fashioning the endless pan spring 48 will have different dimensions from the linear springs used to fashion the endless tilt springs 48'. In this preferred embodiment the linear springs used to form tilt springs 48' are smaller than the linear spring used to form pan spring 48.

There will now be described a technique for assembling the frictional bearing arrangement of the present invention.

Once the endless toroidal coil spring 48 or 48' has been fashioned, it is wrapped around the inner race-defining member 40 or 30, as the case may be. Preferably the spring is dimensioned so that a modest amount of stretching is required to fit the spring over its corresponding inner race-defining member and so that the spring is held in circumferential tension around the inner race-defining member.

As the next step, the inner race-defining member with the spring wrapped therearound is inserted into the outer race-defining member 42 or 24, 26, as the case may be. The dimensioning of the spring 48 is preferably such that, when installed between the pair of race-defining elements, the spring is subjected to a modest amount of compression so that the spring presses outwardly against both elements of the pair of race-defining elements. Thus the coil springs are held in cross-sectional compression to impart a desired degree of frictional force to resist relative movement by the pair of race-defining members.

A camera mounting assembly provided in accordance with the invention, with toroidal coil springs mounted in the ball bearing races instead of the ball bearings used in the motor-driven assembly, has been found to perform satisfactorily when exposed to temperatures in the range −15° C. to 100° C. The above-described stainless steel wire springs were employed and are believed to significantly contribute to the ability of this design to function satisfactorily over the broad range of temperatures noted above. Moreover, it is believed that appropriate functioning at even lower temperatures than −15° C. would be achieved with the use of the stainless steel wire springs. For less demanding applications, it is contemplated to use a different type of frictional resistance member in place of the stainless steel wire endless toroidal coil spring in the bearing race plenums. For example, a rubber or plastic O-ring could be used. However, it is believed that a rubber or plastic frictional resistance element would tend to deteriorate over time, which could cause the camera mounting assembly to slip from its desired position and/or make it difficult to adjust the mounting assembly to a new desired position.

As an alternative to the above-mentioned coil springs and O-rings, which are unitary bodies, a plurality of discrete frictional bodies could be disposed in one or more of the race plenums.

From the above discussion of FIG. 5, it will be understood that the preferred coil spring has an essentially uniform outer cross-sectional diameter around the entire circumference of the endless coil spring. However, it is contemplated to provide a different endless spring, in which at least one or more sections of the spring are replaced with an un-coiled wire or other structure connecting coil spring sections.

The manually adjustable fixed position camera mounting assembly disclosed herein represents an economical and highly functional adaptation of the motor-driven, remotely controllable camera mounting assembly of the aforementioned '042 patent application. Use of a toroidal metal coil spring in each of the bearing race plenums causes the assembly to be quite durable and to function satisfactorily over a wide range of temperature. This is a particularly desirable feature for a surveillance camera mounting assembly, since such assemblies are frequently mounted outside of buildings and may be subjected to extreme temperatures.

Although a three-plenum design has been shown herein, including a vertical-axis (panning) plenum, and two horizontal-axis (tilting) plenums which rotate in tandem, it is contemplated to apply the principles of the present invention to camera mounting structures having one, two or four or more bearing race plenums therein.

It is to be understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A video camera mounting assembly, comprising:
   a camera mounting structure;
   first means for defining a first toroidal race plenum, said first plenum having a first axis, said first means including first race means for defining a first side of said first plenum and second race means for defining a second side of said first plenum;
   second means, installed in said first plenum, for providing substantial resistance to relative movement between said first race means and said second race means and for permitting said first race means to be manually rotated relative to said second race means; and
   third means for securing said camera mounting structure to said first means.

2. A video camera mounting assembly according to claim 1, wherein said second means includes a first coil spring.

3. A video camera mounting assembly according to claim 2, wherein said first coil spring is in the form of a toroid having an axis that coincides with said first axis.

4. A video camera mounting assembly according to claim 1, wherein said first race means defines an inner side of said first plenum and said second race means defines an outer side of said first plenum.

5. A video camera mounting assembly according to claim 4, wherein said third means secures said camera mounting structure to said first race means.

6. A video camera mounting assembly according to claim 5, further comprising:
   fourth means for defining a second toroidal race plenum, said second plenum having a second axis that is angled relative to said first axis, said fourth means including third race means for defining a first side of said second plenum and fourth race means for defining a second side of said second plenum;
   fifth means, installed in said second plenum, for providing substantial resistance to relative movement between said third race means and said fourth race means and for permitting said third race means to be manually rotated relative to said fourth race means; and
   sixth means for securing said first means to said fourth means.

7. A video camera mounting assembly according to claim 6, wherein said fifth means includes a second coil spring.

8. A video camera mounting assembly according to claim 7, wherein said second coil spring is in the form of a toroid having an axis that coincides with said second axis.

9. A video camera mounting assembly according to claim 6, wherein said third race means defines an inner side of said second plenum and said fourth race means defines an outer side of said second plenum.

10. A video camera mounting assembly according to claim 9, wherein said sixth means secures said second race means to said third race means.

11. A video camera mounting assembly according to claim 10, further comprising:
    seventh means for defining a third toroidal race plenum, said third plenum having an axis that coincides with said first axis, said seventh means including fifth race means for defining a first side of said third plenum and sixth race means for defining a second side of said third plenum; and
    eighth means, installed in said third plenum, for providing substantial resistance to relative movement between said fifth race means and said sixth race means and for permitting said fifth race means to be manually rotated relative to said sixth race means;
    said third means being connected to said seventh means.

12. A video camera mounting assembly according to claim 11, wherein said eighth means includes a third coil spring.

13. A video camera mounting assembly according to claim 12, wherein said third coil spring is in the form of a toroid having an axis that coincides with said first axis.

14. A video camera mounting assembly according to claim 11, wherein said fifth race means defines an inner side of said third plenum and said sixth race means defines an outer side of said third plenum.

15. A video camera mounting assembly according to claim 14, wherein said third means secures said camera mounting structure to said fifth race means.

16. A video camera mounting assembly according to claim 11, wherein said first axis is horizontal and said second axis is vertical.

17. A video camera mounting assembly according to claim 16, wherein said first and third plenums are not concentric.

18. A video camera mounting assembly according to claim 17, wherein said first axis intersects said second axis.

19. A video camera mounting assembly according to claim 18, wherein said first plenum is disposed to one side of said second axis, and said third plenum is disposed to an opposite side of said second axis relative to said first plenum.

20. A video camera mounting assembly according to claim 1, further comprising:
    fourth means for defining a second toroidal race plenum, said second plenum having a second axis that is angled relative to said first axis, said fourth means including third race means for defining a first side of said second plenum and fourth race means for defining a second side of said second plenum;
    fifth means, installed in said second plenum, for providing substantial resistance to relative movement between said third race means and said fourth race means and for permitting said third race mans to be manually rotated relative to said fourth race means; and
    sixth means for securing said first means to said fourth means.

21. A video camera mounting assembly according to claim 20, further comprising:
    seventh means for defining a third toroidal race plenum, said third plenum having an axis that coincides with said first axis, said seventh means including fifth race means for defining a first side of said third plenum and sixth race means for defining a second side of said third plenum;
    eighth means, installed in said third plenum, for providing substantial resistance to relative movement between said fifth race means and said sixth race means and for permitting said fifth race means to be manually rotated relative to said sixth race means;
    said third means being connected to said seventh means.

22. A video camera mounting assembly according to claim 21, wherein said second means consists of a first toroidal coil spring, said fifth means consists of a second toroidal coil spring, and said eighth means consists of a third toroidal coil spring.

23. A video camera mounting assembly according to claim 22, wherein said first and third coil springs are substantially equal in size and are smaller than said second coil spring.

24. A video camera mounting assembly according to claim 23, wherein said first, second and third coil springs are formed of metal.

25. A video camera mounting assembly according to claim 20, wherein said second means consists of a single unitary body and said fifth means consists of a single unitary body.

26. A video camera mounting assembly, comprising:

a camera mounting structure;

first means for defining a first toroidal race plenum, said first plenum having a horizontal axis;

second means for defining a second toroidal race plenum, said second plenum having a vertical axis;

a first coil spring installed in said first plenum;

a second coil spring installed in said second plenum;

third means for securing said camera mounting structure to one of said first means and said second means; and fourth means for securing said first means to said second means.

27. A video camera mounting assembly according to claim 26, wherein said coil springs are formed of metal.

28. A video camera mounting assembly according to claim 27, wherein said coil springs are formed of stainless steel.

29. A video camera mounting assembly according to claim 26, wherein each of said coil springs is in the form of an endless spring having a toroidal shape.

30. A video camera mounting assembly according to claim 26, wherein:

said first means is formed of a first race-defining part which defines an inside of said first plenum and a second race-defining part for defining an outside of said first plenum;

said second means is formed of a third race-defining part which defines an inside of said second plenum and a fourth race defining part for defining an outside of said second plenum;

said first coil spring is sized to inhibit relative movement between said first and second race-defining parts; and said second coil spring is sized to inhibit relative movement between said third and fourth race-defining parts.

31. A video camera mounting assembly according to claim 30, wherein:

said third means secures said camera mounting structure to said first race-defining part; and said fourth means secures said second race-defining part to said third race-defining part;

and further comprising:

fifth means, secured to said camera mounting structure, for defining a third toroidal race plenum, said third plenum having an axis that coincides with said horizontal axis; and a third coil spring installed in said third plenum.

* * * * *